United States Patent [19]

Wiewiorowski et al.

[11] 3,965,248

[45] June 22, 1976

[54] REMOVAL OF $P_2O_5$ FROM ALUMINUM FLUORIDE ENRICHED CRYSTALLIZATION MOTHER LIQUORS

[75] Inventors: Tadeusz K. Wiewiorowski; Michael O. Nutt, both of New Orleans, La.

[73] Assignee: Freeport Minerals Company, New York, N.Y.

[22] Filed: Aug. 12, 1974

[21] Appl. No.: 496,447

[52] U.S. Cl. ............................... 423/489; 423/87; 423/126; 423/305
[51] Int. Cl.² ..................... C01F 7/50; C01B 25/26; C01G 29/00
[58] Field of Search ............ 423/305, 126, 489, 87, 423/592

[56] References Cited

UNITED STATES PATENTS

| | | | |
|---|---|---|---|
| 508,796 | 11/1893 | Ackerman | 423/126 |
| 1,391,172 | 9/1921 | Doremus | 423/132 |
| 1,403,183 | 1/1922 | Milligan | 423/126 |
| 1,797,994 | 3/1931 | Morrow | 423/489 X |
| 2,780,524 | 2/1957 | Gloss et al. | 423/341 |
| 2,842,426 | 7/1958 | Glocker | 423/126 |
| 2,920,938 | 1/1960 | Matoush | 428/126 |
| 2,958,575 | 11/1960 | Allen | 423/489 |
| 3,056,650 | 10/1962 | Matoush | 423/126 |
| 3,057,681 | 10/1962 | Gernes et al. | 423/489 |
| 3,386,892 | 6/1968 | Schmidt et al. | 423/472 X |

FOREIGN PATENTS OR APPLICATIONS

| | | | |
|---|---|---|---|
| 233,634 | 12/1971 | U.S.S.R. | 423/489 |
| 15,083 | 1892 | United Kingdom | 423/489 |
| 643,379 | 9/1950 | United Kingdom | 423/489 |

OTHER PUBLICATIONS

J. W. Mellor's "A Comp. Treatise on Inorganic and Theoretical Chemistry", vol. 9, 1929 Ed., p. 711, Longmans, Green & Co., N.Y.
Bureau of Mines Report of Investigations, No. 5997 "Methods For Producing Alumina From Clay" (1962) by F. A. Peters et al.
Bureau of Mines Report of Investigations, No. 6133, "Methods For Producing Alumina From Clay" (1962) by F. A. Peters et al.
Bureau of Mines Report of Investigations, No. 6229, "Methods For Producing Alumina From Clay" (1963) by F. A. Peters et al.
Bureau of Mines Report of Investigations, No. 6290, "Methods For Producing Alumina From Clay" (1963), by F. A. Peters et al.
Bureau of Mines Report of Investigations, No. 6431, "Methods For Producing Alumina From Clay" (1964), by Paul W. Johnson et al.
Bureau of Mines Report of Investigations, No. 6573, "Methods For Producing Alumina From Clay" (1965), by F. A. Peters et al.
Bureau of Mines Report of Investigations, No. 6730, "A Cost Est. Of The Bayer Process for Prod. Alumina" (1966), by F. A. Peters et al.
Bureau of Mines Report of Investigations, No. 7758, "Methods For Producing Alumina From Clay" (1973), by P. J. Barrett et al.
Bureau of Mines Report of Investigations, No. 6927, "Methods For Producing Alumina From Clay" (1967), by F. A. Peters et al.

*Primary Examiner*—Edward Stern
*Attorney, Agent, or Firm*—Ronald A. Schapira

[57] ABSTRACT

Aqueous $AlF_3$ enriched crystallization mother liquors contaminated with $P_2O_5$ values and having less than 5% free acidity are treated with a material which provides bismuth ions in the mother liquor in amounts small enough to insure that the $Bi/PO_4$ mole ratio remains below about 1.05. Under these conditions, the bismuth and $P_2O_5$ react essentially quantitatively to form a $BiPO_4$ precipitate by which the $P_2O_5$ can be separated from the mother liquor. Bismuth can be regenerated from the $BiPO_4$ and recycled for further use in the process.

The invention finds utility in the preparation of $AlF_3$ by the reaction of an aluminum ore and $P_2O_5$ contaminated HF or $H_2SiF_6$ such as that available as a by-product of wet process phosphoric acid manufacture. The $AlF_3$ reaction product is recovered by a crystallization step which, because it is normally only about 70 to 90% efficient, produces a mother liquor containing substantial amounts of $AlF_3$. For economic reasons, this mother liquor is usually recycled to the process. However, the $P_2O_5$ introduced with the HF or $H_2SiF_6$ reactant appears in the $AlF_3$ enriched mother liquor and prevents recycle of the mother liquor for fear of contaminating the $AlF_3$ product with $P_2O_5$. The bismuth treatment of the present invention permits the recycle of the mother liquor to recover its $AlF_3$ content by reducing the $P_2O_5$ level, without leaving undesirably high levels of bismuth contaminants in the recycled mother liquor.

7 Claims, 1 Drawing Figure

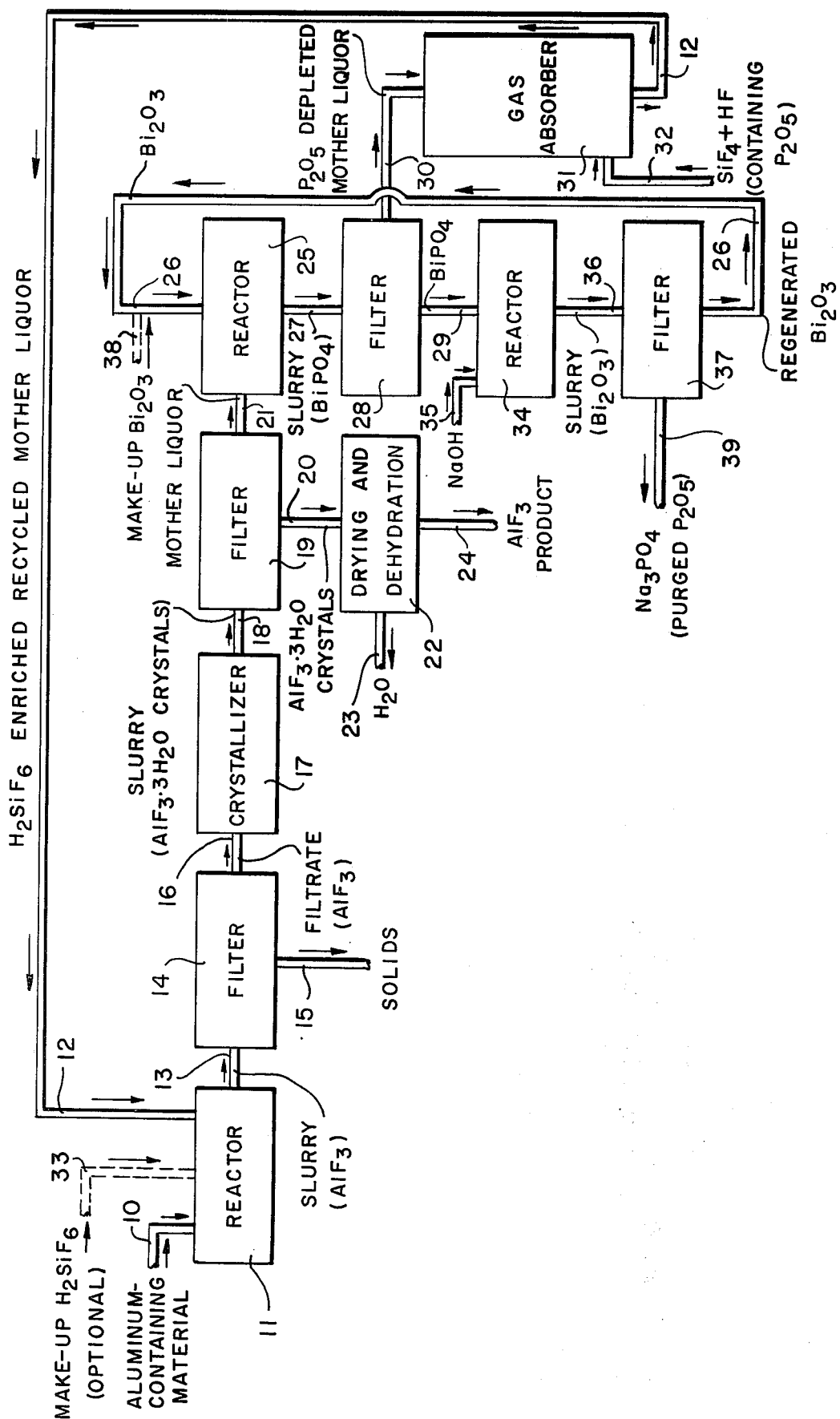

REMOVAL OF P₂O₅ FROM ALUMINUM FLUORIDE ENRICHED CRYSTALLIZATION MOTHER LIQUORS

BACKGROUND OF THE INVENTION

This invention relates to a method for reducing the $P_2O_5$ content of aqueous aluminum fluoride ($AlF_3$) enriched crystallization mother liquors such as those encountered in the production of $AlF_3$ by the reaction of an aluminum-containing material and $P_2O_5$ contaminated fluorine containing acid, for example, the fluorine acids commonly produced as by-products of wet process phosphoric acid manufacture.

$AlF_3$ is produced by reacting an aluminum source such as high purity aluminum, alumina, bauxite or clay with a fluorine-containing inorganic acid such as hydrofluoric acid (HF), fluosilicic acid ($H_2SiF_6$), or a mixture thereof. The $AlF_3$ product is recovered by subjecting the liquid phase of the reaction mixture, in which the $AlF_3$ is dissolved, to crystallization in order to produce crystals of hydrated $AlF_3$ which can then be dried and dehydrated to yield the desired $AlF_3$. Examples of various processes for producing $AlF_3$ are described in commonly assigned co-pending U.S. application Ser. No. 496,577 filed Aug. 12, 1974 in the names of T. K. Wiewiorowski and D. J. Miller entitled "Production of Alumina From Ores", U.S. Pats. 508,796, 1,391,172, 1,403,183, 2,842,426 and 2,920,938 and British Patents 15,083 and 643,379, said patent application and patents incorporated herein by reference.

One plentiful and relatively inexpensive source of the fluorine acid required in such processes is by-product acid from the manufacture of wet process phosphoric acid. As is known, the wet process generates large amounts of acids such as HF and $H_2SiF_6$, as well as mixtures of $SiF_4$ and HF vapors which can be absorbed in aqueous streams to form $H_2SiF_6$. Unfortunately, the by-product fluorine acids from wet process phosphoric acid manufacture usually contain small concentrations of $P_2O_5$ which, if not removed, eventually build to the point where they create intolerable impurity levels in the $AlF_3$ product and in process recycle streams enriched in $AlF_3$. One such recycle stream is the mother liquor produced in the above described crystallization of the hydrated $AlF_3$ from the liquid phase of the reaction mixture, and it is toward the removal of $P_2O_5$ contaminants from this recycled mother liquor that the present invention is directed.

The crystallization of hydrated $AlF_3$ is rarely, if ever, quantitative. The normal experience is that this crystallization is only about 70 to 90% efficient. Consequently, substantial amounts, e.g., where to 30% of the $AlF_3$ reaction product, do not crystallize, and remain dissolved in the crystallization mother liquor. For economic reasons, it is considered necessary to recycle this $AlF_3$ enriched mother liquor to the reaction step or any other convenient step of the process in order to recover its substantial and valuable $AlF_3$ content. However, much of the $P_2O_5$ introduced to the process by the $P_2O_5$ contaminated fluorine acid remains in this mother liquor and often prevents the recycle of the mother liquor because the $P_2O_5$ then shows up, in excessive amounts, as an impurity in the $AlF_3$ product. The major use of aluminum fluoride is in the electrolytic reduction of alumina to aluminum metal, and stringest specifications are imposed for the upper limit of $P_2O_5$ in $AlF_3$ intended for this purpose. The current commercial specification for such $AlF_3$ permits a maximum of about 0.02% by weight $P_2O_5$, a level low enough to often prohibit recycle of the $P_2O_5$ contaminated crystallization mother liquor. It is evident therefore that the overall efficiency of the $AlF_3$ manufacturing process could be improved if the $P_2O_5$ level in the crystallization mother liquor could be reduced to the point were the mother liquor could be recycled to recover its substantial $AlF_3$ content without the risk of unduly contaminating the $AlF_3$ product with $P_2O_5$.

It is, therefore, a general object of this invention to provide an expeditious and economically attractive method for reducing the $P_2O_5$ levels in the aqueous $AlF_3$ enriched crystallization mother liquors generated in the production of $AlF_3$ to the point where the mother liquor can be recycled to the process without causing undue $P_2O_5$ contamination of the $AlF_3$ product.

It is another object of the invention to provide a method for increasing the recovery of high purity $AlF_3$ in an $AlF_3$ manufacturing process which generates $AlF_3$ enriched mother liquors which are contaminated with $P_2O_5$ values.

It is another object of the invention to provide a method which renders the use of $P_2O_5$ contaminated fluorine acid, such as that produced as a by-product in wet process phosphoric acid manufacture, a more attractive source of fluorine for the preparation of $AlF_3$.

These and other objects of the invention will be apparent to those skilled in the art upon consideration of this specification in its entirety including the accompanying drawing illustrating a preferred embodiment of the invention.

SUMMARY OF THE INVENTION

The above objectives are accomplished, in accordance with the invention, by treating an $AlF_3$ enriched, $P_2O_5$ contaminated crystallization mother liquor of the type encountered in the production of $AlF_3$, with a material which provides bismuth ions therein in an amount small enough to insure a $Bi/PO_4$ mole ratio of less than about 1.05, while the acidity of the mother liquor, expressed as weight percent $H_2SiF_6$, is less than about 5%, to precipitate the $P_2O_5$ as bismuth phosphate, and separating the treated mother liquor from the bismuth phosphate precipitate.

The removal of the $P_2O_5$ values proceeds in accordance with the following equation:

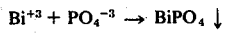

$$Bi^{+3} + PO_4^{-3} \rightarrow BiPO_4 \downarrow$$

Although the actual phosphorus contaminant in the mother liquor is chemically present as phosphate ions ($PO_4^{-3}$), it is the common practice among those skilled in the art to describe it in terms of $P_2O_5$ content and to report the observed levels of the contaminant in terms of $P_2O_5$ instead of phosphate.

It has been found that unless the acidity of the $P_2O_5$ contaminated $AlF_3$ mother liquor is less than about 5%, expressed as $H_2SiF_6$, there is no appreciable precipitation of $BiPO_4$ unless stoichiometric excesses of bismuth are employed. However, such excesses leave residual bismuth in the mother liquor which is undesirable because it represents a loss of expensive bismuth and can unduly contaminate the $AlF_3$ product with bismuth when the treated mother liquor is recycled to the process. Thus the invention must be practiced under conditions which permit the $P_2O_5$ to precipitate as bismuth phosphate but without leaving substantial amounts of bismuth ions in the mother liquor. These conditions prevail when (1) the amount of bismuth used does not exceed about 105% of the stoichiometric amount needed to convert all the $P_2O_5$ in the mother liquor to bismuth phosphate, and (2) the acidity of the mother liquor is less than about 5%, expressed as $H_2SiF_6$. Under such conditions, the bismuth reacts essentially quantitatively with the $P_2O_5$ values to form bismuth phosphate so that most of the bismuth appears in the bismuth phosphate precipitate while only negligible amounts remain in the mother liquor. Thus the successful removal of the $P_2O_5$ values, in accordance with the invention, requires that the $Bi/PO_4$ mole ratio remain below about 1.05 and that the acidity of the mother liquor be less than about 5% at the same time of treatment.

The acidity of the $AlF_3$ enriched mother liquor refers to the amount of acid such as $H_2SiF_6$ or HF present therein. Acidity levels are determined in accordance with analytical procedures known to those skilled in the art and are usually reported by those skilled in the art in terms of the percentage $H_2SiF_6$ even though the mother liquor may contain other unreacted acids which contribute to the reported acidity figure. Acids other than $H_2SiF_6$ which contribute to the free acidity level are normally converted to an equivalent $H_2SiF_6$ basis and reported as part of the $H_2SiF_6$ acidity figure. Generally, however, $H_2SiF_6$ is the major acid found in the mother liquors of greatest interest.

Under the above reaction conditions, as little or as much of the $P_2O_5$ as desired can be satisfactorily precipitated from the mother liquor. Usually enough $P_2O_5$ is removed to insure that the $P_2O_5$ level of the mother liquor, in the form it is ultimately recycled to the process, is less than about 300 p.p.m. by weight and preferably less than about 250 p.p.m. When the mother liquor is to be blended with another $P_2O_5$ contaminated stream following the bismuth treatment of the invention, the amount of $P_2O_5$ removed will depend upon the extent of $P_2O_5$ contamination present in the other stream. Enough $P_2O_5$ must be removed by the bismuth treatment so that when the treated mother liquor is blended with the $P_2O_5$ contaminated stream and the resulting blend then recycled, the $P_2O_5$ concentration of the blend is less than about 300 p.p.m., and preferably less than about 250 p.p.m. This assures an acceptable level of $P_2O_5$ in the $AlF_3$ product which, at present, calls for a maximum of between about 0.01 and 0.02% $P_2O_5$ by weight on the basis of dehydrated $AlF_3$.

After the $P_2O_5$ has precipitated as bismuth phosphate, the precipitate is separated from the mother liquor and the mother liquor then safely recycled to the $AlF_3$ process to recover its $AlF_3$ values, without fear of unduly contaminating the $AlF_3$ product.

Because the reaction of the bismuth and phosphate is essentially quantitative, virtually all the bismuth appears in the bismuth phosphate precipitate. This minimizes bismuth losses and bismuth contamination of the $AlF_3$ product. It also allows for essentially complete regeneration of the bismuth values by treating the bismuth phosphate with a strongly basic hydroxide. The regenerated bismuth solids can then be separated from the reaction mixture and returned to treat additional $P_2O_5$ contaminated mother liquor.

The invention is described in greater detail below in conjunction with a preferred embodiment thereof shown in the accompanying drawing.

BRIEF DESCRIPTION OF THE DRAWINGS

The drawing is a schematic flowsheet of a preferred embodiment of the method of the invention.

DESCRIPTION OF THE PREFERRED EMBODIMENTS

The left side of the accompanying drawing generally shows a conventional process for preparing $AlF_3$ by reacting an aluminum-containing material with $P_2O_5$ contaminated $H_2SiF_6$ to produce a solution of $AlF_3$ from which $AlF_3 \cdot 3H_2O$ crystals are recovered and then dried and dehydrated to produce the $AlF_3$ product. The right side of the drawing illustrates the use of the invention in conjunction with the conventional $AlF_3$ manufacturing process in order to remove $P_2O_5$ values from $AlF_3$ enriched crystallization mother liquor produced in the process, so that the mother liquor can be recycled to the process without unduly contaminating the $AlF_3$ product with $P_2O_5$.

Referring to the drawing, an aluminum-containing material 10 such as bauxite, clay or alumina is charged to a reactor 11 along with an $H_2SiF_6$ enriched process recycle stream 12 which supplies the required $H_2SiF_6$. This stream contains $P_2O_5$ values which it introduces into the $AlE_3$ process. The $H_2SiF_6$ content of stream 12 is normally about 15 to 25% by weight. The aluminum enriched material 10 and $H_2SiF_6$ 12 react to produce a slurry 13 whose liquid phase is an aqueous solution of $AlF_3$. The slurry 13 is sent to a filter 14 where the solids 15 are separated from the $AlF_3$ enriched aqueous phase. The aqueous filtrate 16, which illustratively contains about 100 to 300 grams per liter (g.p.l.) $AlF_3$, is then sent to a crystallizer 17 where a slurry 18 is produced comprising crystals of $AlF_3 \cdot 3H_2O$ and a crystallization mother liquor. The crystallization is illustratively conducted at temperatures of about 140° to 212°F. with retention times of about 2 to 6 hours. Because the crystallization is only about 70 to 90% efficient, the crystallization mother liquor is enriched in dissolved $AlF_3$. The crystallization slurry 18 is sent to a filter 19, to separate the $AlF_3 \cdot 3H_2O$ crystals 20 from the $AlF_3$ enriched mother liquor 21, after which the crystals 20 are subjected to drying and dehydration 22 at illustrative temperatures of 200° to 1400°F. to remove water 23 and produce the desired $AlF_3$ product 24.

The separated mother liquor 21 normally has a pH of about 1 to 6 and illustratively contains less than about 5% acidity, expressed as $H_2SiF_6$, and about 10 to 80 g.p.l. $AlF_3$. Preferably, mother liquor 21 contains about 20 to 40 g.p.l. $AlF_3$ and has a pH of about 2 to 5. The $P_2O_5$ content of mother liquor 21 can vary considerably depending upon the extent of $P_2O_5$ contamination in the fluorine acid charged to reactor 11. Illustratively, the $P_2O_5$ to content of the mother liquor 21 is about 25 to 300 parts per million (p.p.m.) by weight, and normally is in the range of about 200 p.p.m.

The $P_2O_5$ contaminated mother liquor 21 is then sent to a reactor 25 for treatment, in accordance with the present invention, to remove the $P_2O_5$ prior to recycling the mother liquor to the process.

Thus the $P_2O_5$ contaminated mother liquor 21 is reacted with a source of bismuth ions such as bismuth oxide 26 in reactor 25 to form a slurry 27 containing bismuth phosphate ($BiPO_4$) solids and a liquid phase comprising the $P_2O_5$ depleted mother liquor. The removal of the $P_2O_5$ values proceeds according to the following reaction:

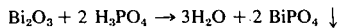
$$Bi_2O_3 + 2\ H_3PO_4 \rightarrow 3H_2O + 2\ BiPO_4 \downarrow$$

The $P_2O_5$ values precipitate from the mother liquor 21 as $BiPO_4$ and can therefore be conveniently separated therefrom. While $Bi_2O_3$ is a preferred source of bismuth, it is to be understood that any bismuth compound capable of providing bismuth ions in the mother liquor could also be used. Illustrative sources of bismuth include the oxides, hydroxides and carbonates of bismuth including such compounds as bismuth hydroxide, $Bi(OH)_3$, and bismutn carbonate, $Bi_2(CO_3)_3$, or any other bismuth compound capable of reacting with the $P_2O_5$ values in the mother liquor to form $BiPO_4$.

The amount of bismuth compound added is carefully controlled to insure that not more than about a 5% stoichiometric excess of bismuth is provided in the mother liquor. Stated differently, only enough bismuth compound is added to provide a $Bi/PO_4$ mole ratio of about 1.05 or less. Since the acidity of the mother liquor 21 is normally less than 5%, expressed as $H_2SiF_6$, the $P_2O_5$ precipitation reaction is essentially stoichiometric or quantitative. Consequently, normally about one equivalent of bismuth will be added for every equivalent of phosphate which is to be removed. Thus when it is desired to remove less than all the phosphate present in the solution, the $Bi/PO_4$ mole ratio will be less than 1.0, depending upon what proportion of the phosphate is to be removed. The lower the degree of phosphate removal desired, the lower the $Bi/PO_4$ mole ratio. If essentially all the phosphate is to be removed, the $Bi/PO_4$ mole ratio will be on the order of 1.0 to 1.05. Illustratively, enough bismuth is supplied to the mother liquor 21 to provide a $Bi/PO_4$ mole ratio of about 0.1 to 1.05. The stoichiometric $Bi/PO_4$ ratio required to remove all the phosphate in the mother liquor is, of course, 1.0.

By carefully restricting the amount of excess bismuth to 5% or less, based on the total phosphate in the mother liquor, virtually all the bismuth precipitates as $BiPO_4$ so that the mother liquor does not retain appreciable amounts of dissolved bismuth as an impurity. This minimizes the waste of bismuth, which is expensive, as well as bismuth contamination of the $AlF_3$ product when the treated mother liquor is recycled to the process.

The amount of $P_2O_5$ removed will generally depend upon the maximum allowable $P_2O_5$ level in the $AlF_3$ product and the $P_2O_5$ concentration of the fluorine acid used in the process. For example, as the maximum allowable $P_2O_5$ level in the $AlF_3$ decreases and/or the $P_2O_5$ level in the $H_2SiF_6$ increases, progressively more $P_2O_5$ must be removed by the bismuth treatment of the invention. Under certain circumstances, however, it may not be necessary to remove essentially all the $P_2O_5$ values from mother liquor 21 since a certain level of $P_2O_5$ is permissible in the $AlF_3$ product, thus permitting the purge of some $P_2O_5$ from the system with the $AlF_3$ product.

The reaction between the mother liquor and the bismuth compound is illustratively carried out at temperatures of about 70° to 400°F., with agitation, and for about 20 minutes to 5 hours. Preferably, the reaction proceeds at about 140° to 212°F., with agitation, for about 30 minutes to one hour. Reaction pressures are not critical and the reaction proceeds satisfactorily at substantially ambient or atmospheric pressures.

After treatment with the $Bi_2O_3$, the reaction slurry 27 is sent to a filter 28 where the $BiPO_4$ solids 29 are separated from the $P_2O_5$ depleted mother liquor 30. The mother liquor 30 is then sent to a gas absorber 31 where it is contacted with a mixture 32 of by-product silicon tetrafluoride ($SiF_4$) and HF vapors from a wet process phosphoric acid facility. These vapors usually come from the attack zone and defluorination operations of the wet process and contain small amounts of $P_2O_5$ values which are transferred to the mother liquor 30 in the absorber 31. The $SiF_4$ and HF vapors react in the mother liquor 30 to form $H_2SiF_6$ and produce an $H_2SiF_6$ enriched mother liquor 12 which is then recycled to reactor 11 where it supplies the $H_2SiF_6$ requirement of the $AlF_3$ process.

Since the treated mother liquor 30 picks up $P_2O_5$ values as it passes through the absorber 31, the extent of this $P_2O_5$ pick-up must be considered in determining how much of the $P_2O_5$ must be previously removed from the mother liquor by the bismuth treatment of the invention. Illustratively, enough $P_2O_5$ must be removed by the bismuth treatment so that the residual $P_2O_5$ in the treated mother liquor plus that it will later pick up in absorber 31 amounts to less than 300, and preferably less than 250 p.p.m. This will assure a $P_2O_5$ content in the recycled mother liquor 12 low enough to not cause excessive $P_2O_5$ contamination of the $AlF_3$ product 24.

As can now be appreciated, were the crystallization mother liquor 21 to be recycled to the process without purging it of at least some of its $P_2O_5$ values, the continual input of $P_2O_5$ values in stream 32 would cause a steady contamination of $P_2O_5$ in recycled stream 12 until eventually enough of this $P_2O_5$ would show up in the $AlF_3$ product 24 to render it unfit for the production of aluminum metal. The present invention provides a method for purging from the system enough $P_2O_5$ to keep the system in an acceptable $P_2O_5$ balance consistent with the $P_2O_5$ specifications of the $AlF_3$ product.

The $P_2O_5$ depleted mother liquor 30 can, of course, be recycled to the reactor 11 without first passing through gas absorber 31. In this case, the recycled stream 12 would not contain the $H_2SiF_6$ required in reactor 11 and it would be necessary to add fresh $H_2SiF_6$ make-up 33 to reactor 11 to supply this deficiency. If this make-up $H_2SiF_6$ 33 was by product acid from the manufacture of wet process phosphoric acid, it too would contain $P_2O_5$ values which undesirably accumulate in the system, so that the purging of $P_2O_5$ values from the mother liquor using the bismuth treatment of the invention could still be beneficially applied.

The $BiPO_4$ solids 29 separated from the treated mother liquor are then sent to a reactor 34 where they are contacted with an aqueous solution of a highly alkaline hydroxide such as NaOH 35, KOH, or other alkali metal hydroxides, to regenerate the bismuth compound in accordance with the following reaction:

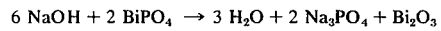
$$6\ NaOH + 2\ BiPO_4 \rightarrow 3\ H_2O + 2\ Na_3PO_4 + Bi_2O_3$$

The above reaction produces a slurry 36 containing regenerated $Bi_2O_3$ solids which is then sent to a filter 37 where the regenerated $Bi_2O_3$ solids 26 are separated from the aqueous solution of $Na_3PO_4$ 39 which may then be sent to waste or other uses. Stream 39 is, of course, the purge stream which removes the undesirable $P_2O_5$ values contained in the crystallization mother liquor 21 from the system.

Virtually all the bismuth is in the $BiPO_4$, and essentially all this bismuth can be regenerated by the alkaline treatment. The regenerated $Bi_2O_3$ solids are then recycled to the reactor 25 for use in removing $P_2O_5$ from additional mother liquor 21. If bismuth losses are encountered, any deficiency can be remedied by supplying fresh $Bi_2O_3$ make-up 38 to reactor 25.

As can now be appreciated, the invention provides a convenient method for reducing the level of $P_2O_5$ contaminants in the $AlF_3$ enriched crystallization mother liquors normally encountered in a process for producing $AlF_3$ from a fluorine source contaminated with $P_2O_5$. It is of special applicability in removing enough $P_2O_5$ from the mother liquor to permit its recycle to the process, so that its $AlF_3$ values can be recovered without unduly contaminating the $AlF_3$ product with $P_2O_5$.

The following examples are provided to further illustrate the invention.

EXAMPLE 1

An $AlF_3$ enriched crystallization mother liquor was prepared in accordance with known procedures (as generally depicted in the accompanying drawing) by the reaction of $Al(OH)_3$ with $P_2O_5$ contaminated, by-product $H_2SiF_6$ from the manufacture of wet process phosphoric acid. The mother liquor contained 6.5 grams per liter (g./l.) aluminum and 230 milligrams per liter (mg./l,) $P_2O_5$. About 1000 milliliters (1020 grams) of the mother liquor were heated to 12° F. and 0.76 grams of $Bi_2O_3$ were then added to the heated mother liquor. This corresponded to a $Bi/PO_4$ mole ratio of about 1. The $Bi_2O_3$ dissolved and, after stirring for 20 minutes, a precipitate began to form. Stirring was continued for an additional 40 minutes and the precipitate was then separated from the mother liquor by filtration. The precipitate was identified as $BiPO_4$ by X-ray diffraction. Analysis of the filtrate showed the $P_2O_5$ content had dropped to 8 mg./l. and the residual bismuth concentration was 20 mg./l. This indicated that about 96.5% of the $P_2O_5$ originally present in the mother liquor had been removed (230 vs. 8 mg./l.).

EXAMPLE 2 (Comparative)

The crystallization mother liquor prepared in Example 1 (containing 230 mg./l. $P_2O_5$) was treated, as in Example 1, with $Bi_2O_3$ in an amount sufficient to produce a $Bi/PO_4$ mole ratio of about 1. After filtrations of the reaction mixture to remove the $BiPO_4$ precipitate, the mother liquor contained only about 10 mg./l. $P_2O_5$. This indicated that about 95.5% of the $P_2O_5$ originally present in the mother liquor had been removed (230 vs. 10 mg./l.). The treated mother liquor was then sent to a scrubber to absorb a $P_2O_5$ containing mixture of $SiF_4$ and HF vapors in sufficient amount to produce a stream containing 18% $H_2SiF_6$ and about 210 mg./l. $P_2O_5$, coresponding to a pick-up of 200 mg./l. of $P_2O_5$ in the scrubber. The $H_2SiF_6$ enriched stream was then reacted with $Al(OH)_3$ to yield an $AlF_3$ product containing 0.015% by weight $P_2O_5$ which is well below the current commercial $P_2O_5$ specification of 0.02%.

The crystallization mother liquor prepared in Example 1 was then similarly processed except that the $Bi_2O_3$ treatment of the invention was omitted. This produced a recycled stream leaving the scrubber which contained 18% $H_2SiF_6$ and about 430 mg./l. $P_2O_5$, corresponding to a pick-up of 200 mg./l. $P_2O_5$ in the scrubber. The $H_2SiF_6$ enriched stream was then reacted with $Al(OH)_3$ as above to yield an $AlF_3$ product containing 0.03% $P_2O_5$, which far exceeds the current commercial $P_2O_5$ specification of 0.02% $P_2O_5$.

It is thus seen that the method of the invention removes from the mother liquor a sufficient amount of its $P_2O_5$ values to permit recycle of the mother liquor to the process without unduly contaminating the $AlF_3$ product.

The specific and detailed information presented in the above examples and elsewhere herein is for purposes of illustration only, and such alterations and modifications thereof as would be apparent to those skilled in the art are deemed to fall within the scope an spirit of the invention, bearing in mind that the invention is defined only by the following claims.

What is claimed is:

1. In a method for preparing aluminum fluoride, which comprises reacting an aluminum-containing material with a $P_2O_5$ contaminated inorganic fluorine acid to produce an aqueous solution of aluminum fluoride, subjecting the solution to crystallization to recover crystals of hydrated aluminum fluoride, separating the crystals from an aluminum fluoride enriched crystallization mother liquor which contains $P_2O_5$ values, and recycling the separated mother liquor to the process, the improvement which comprises: treating the separated mother liquor prior to recycling with a material which provides bismuth ions therein in an amount which insures a $Bi/PO_4$ mole ratio of about 1.0 to 1.05, while the acidity of the mother liquor is less than about 5%, expressed as weight percent $H_2SiF_6$, to essentially quantitatively precipitate the $P_2O_5$ values as bismuth phosphate; and separating the treated mother liquor from the bismuth phosphate precipitate.

2. The method of claim 1 wherein the material capable of providing bismuth ions is selected from the group consisting of the oxides, hydroxides and carbonates of bismuth.

3. The method of claim 1 wherein the material capable of providing bismuth ions is selected from the group consisting of $Bi_2O_3$, $Bi(OH)_3$ and $Bi_2(CD_3)_3$.

4. The method of claim 1 wherein the pH of the treated mother liquor is 1 to 6.

5. The method of claim 1 further including treating the separated bismuth phosphate with a strongly alkaline hydroxide to produce bismuth oxide, separating the bismuth oxide from the reaction mixture, and using the separated bismuth oxide as a source of bismuth ions in treating additional $P_2O_5$ contaminated mother liquor.

6. In a method for preparing aluminum fluoride which comprises reacting an aluminum-containing material with a $P_2O_5$ contaminated inorganic fluorine acid to produce an aqueous solution of aluminum fluoride, subjecting the solution to crystallization to recover crystals of hydrated aluminum fluoride, separating the crystals from an aluminum fluoride enriched crystallization mother liquor which contains $P_2O_5$ values, and recycling the separated mother liquor to the process, the improvement which comprises treating the separated mother liquor prior to recycling with a material which provides bismuth ions therein in an amount which insures a $Bi/PO_4$ mole ratio of essentially about 1 and below 1.05, while the acidity of the mother liquor is less than about 5%, expressed as weight percent $H_2SiF_6$, to precipitate the $P_2O_5$ values as bismuth phosphate, separating the bismuth phosphate precipitate from the treated mother liquor, treating the separated bismuth phosphate with a strongly alkaline hydroxide to produce bismuth oxide, separating the bismuth oxide from the reaction mixture, and using the separated bismuth oxide as a source of bismuth ions in treating additional $P_2O_5$ containing mother liquor.

7. In a method for preparing alumimum fluoride which comprises reacting an aluminum-containing material with a $P_2O_5$ contaminated inorganic fluorine acid to produce an aqueous solution of aluminum fluoride, subjecting the solution to crystallization to recover crystals of hydrated aluminum fluoride, separating the crystals from an aluminum fluoride enriched crystallization mother liquor which contains $P_2O_5$ values, and recycling the separated mother liquor to the process, the improvement which comprises treating the separated mother liquor prior to recycling with a material which provides bismuth ions therein in an amount which insures a $Bi/PO_4$ mole ratio of 0.1 to 1.05, while the acidity of the mother liquor is less than about 5%, expressed as weight percent $H_2SiF_6$, to precipitate the $P_2O_5$ values as bismuth phosphate, separating the bismuth phosphate precipitate from the treated mother liquor, treating the separated bismuth phosphate with a strongly alkaline hydroxide to produce bismuth oxide, separating the bismuth oxide from the reaction mixture, and using the separated bismuth oxide as a source of bismuth ions in treating additional $P_2O_5$ containing mother liquor.

* * * * *